US012442736B1

(12) United States Patent
Roussel, Jr. et al.

(10) Patent No.: US 12,442,736 B1
(45) Date of Patent: Oct. 14, 2025

(54) MICROFLUIDIC MANIFOLD AND METHODS OF USE THEREOF

(71) Applicant: The University of Louisville Research Foundation, Inc., Louisville, KY (US)

(72) Inventors: Thomas J. Roussel, Jr., Louisville, KY (US); Alexa M. Melvin, Louisville, KY (US); Nichola C. Garbett, Louisville, KY (US); Gabriela Schneider, Louisville, KY (US); Andrew P. DeFilippis, Nashville, TN (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 841 days.

(21) Appl. No.: 17/080,805

(22) Filed: Oct. 26, 2020

Related U.S. Application Data

(60) Provisional application No. 62/925,734, filed on Oct. 24, 2019.

(51) Int. Cl.
*G01N 1/40* (2006.01)
*B01D 63/00* (2006.01)
(Continued)

(52) U.S. Cl.
CPC ......... *G01N 1/4077* (2013.01); *B01D 63/005* (2013.01); *B01L 3/502761* (2013.01);
(Continued)

(58) Field of Classification Search
None
See application file for complete search history.

(56) References Cited

U.S. PATENT DOCUMENTS 4,001,583 A * 1/1977 Barrett ................. C12N 11/082
435/7.8
4,952,904 A 8/1990 Johnson et al.
(Continued)

FOREIGN PATENT DOCUMENTS

EP 3346262 7/2018
WO 2008/089072 7/2008
(Continued)

OTHER PUBLICATIONS

U.S. Appl. No. 17/771,487, filed Apr. 24, 2022, Oct. 26, 2020.
(Continued)

*Primary Examiner* — Elizabeth A Robinson
*Assistant Examiner* — Brittany I Fisher
(74) *Attorney, Agent, or Firm* — EVAN LAW GROUP LLC

(57) ABSTRACT

An extraction chamber includes a main channel, a plasma channel, and a plurality of side channels fluidly connecting the main channel to the plasma channel. Each of the plurality of side channels has an average diameter of at most 200 μm at a narrowest cross section, and the extraction chamber has a separation efficiency of at least 95%. A multilevel extraction chamber, includes a main channel, a secondary channel fluidly connected to the main channel, a plasma channel fluidly connected to the secondary channel, a first set of a plurality of side channels fluidly connecting the main channel to the secondary channel, and a second set of a plurality of side channels fluidly connecting the secondary channel to the plasma channel. Each of the first set of side channels has an average diameter that is greater than the average diameter of each of the second set of side channels, and the extraction chamber has a separation efficiency of at least 95%.

16 Claims, 9 Drawing Sheets

(51) Int. Cl.
*B01L 3/00* (2006.01)
*G01N 1/38* (2006.01)

(52) U.S. Cl.
CPC .............. *B01L 3/567* (2013.01); *G01N 1/38* (2013.01); *B01L 2200/0652* (2013.01); *B01L 2300/123* (2013.01); *B01L 2300/165* (2013.01); *B01L 2400/0605* (2013.01); *B01L 2400/086* (2013.01)

(56) References Cited

U.S. PATENT DOCUMENTS

| | | | |
|---|---|---|---|
| 5,225,766 | A | 7/1993 | O'Neill |
| 5,763,433 | A | 6/1998 | Morfin |
| 6,399,714 | B1 * | 6/2002 | Huang .................. C08G 69/04 428/479.3 |
| 7,141,210 | B2 | 11/2006 | Bell et al. |
| 7,147,763 | B2 | 12/2006 | Elrod et al. |
| 8,066,429 | B2 | 11/2011 | Danley |
| 8,393,785 | B2 | 3/2013 | De Bruyker et al. |
| 8,685,216 | B2 | 4/2014 | De Bruyker et al. |
| 11,835,529 | B1 | 12/2023 | Garbett et al. |
| 2007/0242722 | A1 | 10/2007 | Nakamura |
| 2008/0172184 | A1 | 7/2008 | Chaires et al. |
| 2010/0093100 | A1 | 4/2010 | Chaires et al. |
| 2011/0216804 | A1 | 9/2011 | Roukes et al. |
| 2011/0301860 | A1 | 12/2011 | Chaires et al. |
| 2012/0220047 | A1 * | 8/2012 | Seifried ............... G01N 33/491 422/534 |
| 2014/0339161 | A1 * | 11/2014 | Leonard .............. A61M 1/3472 210/637 |
| 2016/0245794 | A1 | 8/2016 | Hawtin |
| 2017/0191982 | A1 * | 7/2017 | Shatova ............ B01L 3/502746 |
| 2017/0354361 | A1 * | 12/2017 | Tan ................... A61B 5/150022 |
| 2018/0001231 | A1 * | 1/2018 | Puleo ................. B01D 21/0006 |
| 2018/0277250 | A1 | 9/2018 | Garbett et al. |
| 2020/0070167 | A1 * | 3/2020 | Raillon .............. G01N 15/1023 |
| 2022/0365014 | A1 | 11/2022 | Roussel, Jr. et al. |
| 2024/0210422 | A1 | 6/2024 | Garbett et al. |

FOREIGN PATENT DOCUMENTS

| | | |
|---|---|---|
| WO | 2010/033606 | 3/2010 |
| WO | 2011/156658 | 12/2011 |
| WO | 2012/109383 | 8/2012 |
| WO | 2017/066800 | 4/2017 |
| WO | 2017/097854 | 6/2017 |
| WO | 2021/081524 | 4/2021 |

OTHER PUBLICATIONS

4, May 15, 2023, U.S. Appl. No. 15/764,458, US.
3, May 22, 2023, U.S. Appl. No. 17/080,533, US.
4, Jun. 27, 2023, U.S. Appl. No. 15/764,458, US.
10, Jul. 24, 2023, U.S. Appl. No. 17/080,533, US.
4, Sep. 14, 2023, U.S. Appl. No. 17/080,533, US.
28, Mar. 8, 2024, U.S. Appl. No. 15/764,458, US.
14, Apr. 7, 2021, PCT/US2020/057412,WO.
31, Aug. 31, 2022, U.S. Appl. No. 15/764,458, US.
3, Nov. 16, 2022, U.S. Appl. No. 15/764,458, US.
3, Dec. 15, 2022, U.S. Appl. No. 15/764,458, US.
22, Jan. 10, 2023, U.S. Appl. No. 15/764,458, US.
30, Jan. 23, 2023, U.S. Appl. No. 17/080,533, US.
U.S. Appl. No. 15/764,458, filed Mar. 29, 2018, Oct. 17, 2016.
U.S. Appl. No. 17/080,533, filed Oct. 26, 2020.
Cooper, A. et al., "Differential scanning microcalorimetry", Protein-Ligand Interactions: hydrodynamics and calorimetry: a practical approach, Oxford University Press, chapter 11, pp. 287-318, (2001).
Johnson, C.M. "Differential scanning calorimetry as a tool for protein folding and stability", Archives of Biochemistry and Biophysics, vol. 531, pp. 100-109, (2013).
Garbett, N.C. et al., "Clinical application of plasma thermograms. Utility, practical approaches and considerations", Methods, vol. 76, pp. 41-50, (2015).
Garbett, N.C. et al., "Differential scanning calorimetry of blood plasma for clinical diagnosis and monitoring", Experimental and Molecular Patholgy, vol. 86, pp. 186-191, (2009).
Garbett, N.C. et al., "Calorimetry outside the box: a new window into the plasma proteome", Biophysical Journal, vol. 94, pp. 1377-1383, (2008).
Garbett, N.C. et al., "Calorimetric analysis of the plasma proteome", Seminars in Nephrology, vol. 27, issue 6, pp. 621-626, (2007).
Garbett, N.C. et al., "Interrogation of the plasma proteome with differential scanning calorimetry", Clinical Chemistry, vol. 53, issue 11, pp. 2012-2014, (2007).
Garbett, N.C., et al., "Ligand binding alters the calorimetric thermogram of albumin", Journal of Clinical Ligand Assay, vol. 29, pp. 194-197, (2006).
Garbett, N.C. et al., "Calorimetric analysis of the plasma proteome: Identification of type 1 diabetes patients with early renal function decline", Biochimica et Biophysica Acta (BBA)—General Subjects, vol. 1830, issue 10, pp. 4675-4680, (2013).
Garbett, N.C. et al., "Detection of cervical cancer biomarker patterns in blood plasma and urine by differential scanning calorimetry and mass spectrometry", PLOS One, vol. 9, issue 1, e84710, (2014).
Chagovetz, A.A. et al., "Preliminary use of differential scanning calorimetry of cerebrospinal fluid for the diagnosis of glioblastoma multiforme", Journal of Neuro-Oncology, vol. 105, pp. 499-506, (2011).
Chagovetz, A.A. et al., "Differential scanning calorimetry of gliomas: a new tool in brain cancer diagnostics?", Neurosurgery, vol. 73, pp. 289-295, (2013).
Fekecs, T. et al., "Differential scanning calorimetry (DSC) analysis of human plasma in melanoma patients with or without regional lymph node metastases", Journal of Thermal Analysis and Calorimetry, vol. 108, pp. 149-152, (2012).
Ferencz, A. et al., "Differential scanning calorimetry, as a new method to monitor human plasma in melanoma patients with regional lymph node or distal metastases", Skin Cancer Overview, Dr. Yaguang Xi (Ed.), pp. 141-152, (2011).
Fish, D.J. et al., "Statistical analysis of plasma thermograms measured by differential scanning calorimetry", Biophysical Chemistry, vol. 152, pp. 184-190, (2010).
Krumova, S. et al., "Calorimetric monitoring of the serum proteome in schizophrenia patients", Thermochimica Acta, vol. 572, pp. 59-64, (2013).
Mehdi, M. et al., "Differential scanning calorimetry (DSC) analysis of human plasma in different psoriasis stages", Journal of Thermal Analysis and Calorimetry, vol. 111, pp. 1801-1804, (2013).
Michnik, A. "Blood plasma, serum and serum proteins microcalorimetric studies aimed at diagnosis support", Thermal Analysis in Medical Application, pp. 171-190, (2011).
Michnik, A. et al., "Differential scanning calorimetry study of blood serum in chronic obstructive pulmonary disease", Journal of Thermal Analysis & Calorimetry, vol. 102, pp. 57-60, (2010).
Michnik, A. et al., "DSC serum profiles of sportsmen", Journal of Thermal Analysis & Calorimetry, vol. 113, pp. 365-370, (2013).
Moezzi, M. et al., "Evaluation of blood plasma changes by differential scanning calorimetry in psoriatic patients treated with drugs", Journal of Thermal Analysis & Calorimetry, vol. 116, pp. 557-562, (2014).
Rai, S.N. et al., "Group classification based on high-dimensional data: application to differential scanning calorimetry plasma thermogram analysis of cervical cancer and control samples", Open Access Medical Statistics, vol. 3, pp. 1-9, (2013).
Todinova, S. et al., "Microcalorimetry of blood serum proteome: a modified interaction network in the multiple myeloma case", Analytical Chemistry, vol. 83, pp. 7992-7998, (2011).
Todinova, S. et al., "Calorimetry-based profiling of blood plasma from colorectal cancer patients", Biochimica et Biophysica Acta, vol. 1820, pp. 1879-1885, (2012).
Wisniewski, M.A. et al., "Differential scanning calorimetry in molecular diagnostics", In Vitro Diagnostic Technology, vol. 17, pp. 29-34, (2011).

(56) References Cited

OTHER PUBLICATIONS

Zapf, I. et al., "DSC analysis of human plasma in breast cancer patients", Thermochimica Acta, vol. 524, pp. 88-91, (2011).
Vega, S. et al., "Deconvolution analysis for classifying gastric adenocarcinoma patients based on differential scanning calorimetry serum thermograms", Scientific Reports, vol. 5, article No. 7988, pp. 1-8, (2015).
Kikalishvili, L. et al., "Thermal stability of blood plasma proteins of breast cancer patients, DSC study", Journal of Thermal Analysis & Calorimetry, vol. 120, pp. 501-505, (2015).
Zapf, I. et al., "Influence of oxidative injury and monitoring of blood plasma by DSC on breast cancer patients", Journal of Thermal Analysis & Calorimetry, vol. 123, pp. 2029-2035, (2016).
Krumova, S. et al., "Calorimetric features of IgM gammopathies. Implication for patient's diagnosis and monitoring", Thermochimica Acta, vol. 615, pp. 23-29, (2015).
Barceló, F. et al., "Characterization of monoclonal gammopathy of undetermined significance by calorimetric analysis of blood serum proteome", PLOS One, vol. 10, No. 3, e0120316, pp. 1-15, (2015).
Moezzi, M. et al., "Influence of oxidative injury and monitoring of blood plasma by DSC on patients with psoriasis", Journal of Thermal Analysis & Calorimetry, vol. 123, pp. 2037-2043, (2015).
Szalai, Z. et al., "Differential scanning calorimetry (DSC) of blood serum in chronic obstructive pulmonary disease (COPD)", Journal of Thermal Analysis & Calorimetry, vol. 113, pp. 259-264, (2013).
Rasmussen, A. et al., "The lupus family registry and repository", Rheumatology, vol. 50, pp. 47-59, (2011).
Hochberg, M.C., "Updating the american college of rheumatology revised criteria for the classification of systemic lupus erythematosus", Arthritis & Rheumatism, vol. 40, No. 9, p. 1725, (1997).
Ulbricht, J. "Package "lqa" Penalized likelihood inference for GLMs", R package version, pp. 1-42, (2012).
Friedman, J. et al., "Regularization paths for generalized linear models via coordinate descent", Journal of Statistical Software, vol. 33, No. 1, pp. 1-22, (2010).
Becker, N. et al., "penalizedSVM: a R-package for feature selection SVM classification", Bioinformatics, vol. 25, No. 13, pp. 1711-1712, (2009).
Becker, N. et al., "Elastic SCAD as a novel penalization method for SVM classification tasks in high-dimensional data", BMC Bioinformatics, vol. 12, No. 138, pp. 1-13, (2011).
Xu, P. et al., "Modified linear discriminant analysis approaches for classification of high-dimensional microarray data", Computational Statistics & Data Analysis, vol. 53, pp. 1674-1687, (2009).
Witten, D.M. et al., "Penalized classification using Fisher's linear discriminant", Journal of the Royal Statistical Society, Series B, vol. 73, No. 5, pp. 753-772, (2011).
Gaynanova, I. et al., "Simultaneous sparse estimation of canonical vectors in the p >> N setting", Journal of the American Statistical Association, vol. 111, No. 514, pp. 696-706, (2015).
Witten, D. "Package penalizedLDA: Penalized classification using Fisher's linear discriminant", Journal of the Royal Statistical Society, Series B, vol. 73, No. 5, pp. 753-772, (2011).
Gaynanova, I., "MGSDA: Multi-group sparse discriminant analysis", R package version 1.1, pp. 1-8, (2014).
Gromski, P.S. et al., "A tutorial review: Metabolomics and partial least squares-discriminant analysis—a marriage of convenience or a shotgun wedding", Analytica Chimica Acta, vol. 879, pp. 10-23, (2015).
Chun, H. et al., "Sparse partial least squares regression for simultaneous dimension reduction and variable selection", Journal of the Royal Statistical Society, Series B, vol. 72, No. 1, pp. 3-25, (2010).
Chung, D. et al., "Sparse partial least squares classification for high dimensional data", Statistical Applications in Genetics and Molecular Biology, vol. 9, issue 1, article 17, pp. 1-32, (2010).
Kuhn, M., "Building predictive models in R using the caret package", Journal of Statistical Software, vol. 28, issue 5, pp. 1-26, (2008).

Rivero, S.J. et al., "Lymphopenia in systemic lupus erythematosus, clinical, diagnostic, and prognostic significance", Arthritis and Rheumatism, vol. 21, No. 3, pp. 295-305, (1978).
The Autoimmune Diseases Coordinating Committee, "Progress in autoimmune diseases research", National Institutes of Health, U.S. Department of Health and Human Services, (2005).
Illei, G.G. et al., "Biomarkers in systemic lupus erythematosus, II. Markers of disease activity", Arthritis and Rheumatism, vol. 50, No. 7, pp. 2048-2065, (2004).
Ahearn, J.M et al., "Biomarkers for systemic lupus erythematosus", Translational Research, vol. 159, issue 4, pp. 326-342, (2012).
Liu, C-C. et al., "Cell-bound complement biomarkers for SLE: From benchtop to bedside", Rheumatic Disease Clinics North America, vol. 36, issue 1, pp. 161-172, (2010).
Kalunian, K.C. et al., "Measurement of cell-bound complement activation products enhances diagnostic performance in systemic lupus erythematosus", Arthritis & Rheumatism, vol. 64, No. 12, pp. 4040-4047, (2012).
Benjamini, Y. et al., "Controlling the false discovery rate: a practical and powerful approach to multiple testing", Journal of the Royal Statistical Society, vol. 57, No. 1, pp. 289-300, (1995).
Garbett, N.C. et al., "Differential scanning calorimetry as a complementary diagnostic tool for the evaluation of biological samples", Biochimica et Biophysica Acta (BBA)—General Subjects, vol. 1860, issue 5, pp. 981-989, (2016).
Romero-Diaz, J. et al., "Measures of adult systemic lupus erythematosus: updated version of British Isles Lupus Assessment Group (BILAG 2004), European Consensus Lupus Activity Measurements (ECLAM), Systemic Lupus Activity Measure, Revised (SLAM-R), Systemic Lupus Activity Questionnaire for Population Studies (SLAQ), Systemic Lupus Erythematosus Disease Activity Index 2000 (SLEDAI-2K), and Systemic Lupus International Collaborating Clinics/American College of Rheumatology Damage Index (SDI)", Arthritis Care and Research, vol. 63, issue s11, pp. s37-s46, (2011).
Petri, M. et al., "Derivation and validation of the Systemic Lupus International Collaborating Clinics classification criteria for systemic lupus erythematosus", Arthritis and rheumatism, vol. 64, No. 8, pp. 2677-2686, (2012).
Anić, F. et al., "New classification criteria for systemic lupus erythematosus correlate with disease activity", Croatian Medical Journal, vol. 55, pp. 514-519, (2014).
International Search Report and Written Opinion dated Jan. 17, 2017 for PCT application No. PCT/US2016/057416, 11 pages.
"IUPAC-IUB commission on biochemical nomenclature symbols for amino-acid derivatives and peptides recommendations", Biochemistry, vol. 11, No. 9, pp. 1726-1732, (1972).
Heinlen, L.D. et al., "Clinical criteria for systemic lupus erythematosus precede diagnosis, and associated autoantibodies are present before clinical symptoms", Arthritis & Rheumatism, vol. 56, No. 7, pp. 2344-2351, (2007).
International Search Report and Written Opinion dated Apr. 7, 2021 for PCT application No. PCT/US2020/057412, 18 pages.
Rai, S.N. et al., "Multi-group diagnostic classification of high-dimensional data using differential scanning calorimetry plasma thermograms", Plos One, vol. 14, No. 8, pp. 1-17, (2019).
Melvin, A. et al., "Development of a power-compensated MEMS DSC sensor", (Abstract).
Melvin, A. et al., "Development of a power-compensated MEMS DSC sensor", (Poster).
Tsvetkov, P.O. et al., "An AI-powered blood test to detect cancer using nanoDSF", Cancers, vol. 13, pp. 1-9, (2021).
DeFilippis, A.P. et al., "Assessment and treatment of patients with type 2 myocardial infarction and acute nonischemic myocardial injury", Circulation, vol. 140, pp. 1661-1678, (2019).
DeFilippis, A.P. et al., "Identification of a plasma metabolomic signature of thrombotic myocardial infarction that is distinct from non-thrombotic myocardial infarction and stable coronary artery disease", PLOS One, vol. 12, issue 4, pp. 1-23, (2017).
Go, A.S. et al., "Heart disease and stroke statistics 2014 update: A report from the American heart association", Circulation, vol. 129, No. 3, pp. 1-267, (2014).

(56) References Cited

OTHER PUBLICATIONS

Pitts, S.R. et al., "National hospital ambulatory medical care survey: 2006 emergency department summary", National health statistics reports, No. 7, pp. 1-39, (2008).
Newby, L.K. et al., "Accf 2012 expert consensus document on practical clinical considerations in the interpretation of troponin elevations: a report of the American college of cardiology foundation taskforce on clinical expert consensus documents", Journal of the American College of Cardiology, vol. 60, No. 23, pp. 2427-2463, (2012).
Bax, J.J. et al., "Third universal definition of myocardial infarction", Journal of the American College of Cardiology, vol. 60, No. 16, pp. 1581-1598, (2012).
Gore, M.O. et al., "Age-and sex-dependent upper reference limits for the high-sensitivity cardiac troponin t assay", Journal of the American College of Cardiology, vol. 63, No. 14, pp. 1441-1448, (2014).
Javed, U. et al., "Frequency of elevated troponin I and diagnosis of acute myocardial infarction", The American Journal of Cardiology, vol. 104, No. 1, pp. 9-13, (2009).
Wong, P. et al., "Raised cardiac troponin t levels in patients without acute coronary syndrome", Postgraduate Medical Journal, vol. 83, No. 977, pp. 200-205, (2007).
Wong, P. et al., "Effects of comorbidity and hospital care on 6-month mortality inpatients with elevated cardiac troponin t", Postgraduate Medical Journal, vol. 83, No. 979, pp. 332-337, (2007).
Wong, P.S.C. et al., "Early and late mortality in hospitalized patients with raised cardiac troponin t", Postgraduate Medical Journal, vol. 88, No. 1042, pp. 437-442, (2012).
Reeder, G.S. et al., "Overview of the acute management of ST-elevation myocardial infarction", Up to Date, pp. 1-14, found at www.uptodate.com/contents/overview-of-the-acute-management-of-st-elevation-myocardial-infarction?search=Overview of the acute management of ST-elevation myocardial infarction&source=search_result&selectedTitle=1~150&usage_type=default&display_rank=1, (2019).
Reeder, G.S. et al., "Overview of the non-acute management of ST elevation myocardial infarction", Up to Date, pp. 1-12, found at www.uptodate.com/contents/overview-of-the-non-acute-management-of-st-elevation-myocardial-infarction?search=Overview of the non-acute management of ST elevation myocardial infarction&source=search_result&selectedTitle=1~150&usage_type=default&display_rank=1, (2019).
Benjamin, E.J. et al., "Heart Disease and Stroke Statistics—2018 Update: A Report from the American Heart Association", Circulation, vol. 137, pp. e67-e492, (2018).
Thygesen, K. et al., "Fourth Universal Definition of Myocardial Infarction", Circulation, vol. 138, pp. e618-e651, (2018).
Amsterdam, E.A. et al., "2014 AHA/ACC guideline for the management of patients with non-ST-elevation acute coronary syndromes: executive summary: a report of the American College of Cardiology/American Heart Association Task Force on Practice Guidelines", Circulation, vol. 130, pp. 2354-2394, (2014).
Collet, J.P. et al., "2020 ESC Guidelines for the management of acute coronary syndromes in patients presenting without persistent ST-segment elevation", European Heart Journal, vol. 42, pp. 1289-1367, (2021).
Tamis-Holland, J.E. et al., "Contemporary Diagnosis and Management of Patients With Myocardial Infarction in the Absence of Obstructive Coronary Artery Disease: A Scientific Statement From the American Heart Association", Circulation, vol. 139, e891-e908, (2019).
Sarkisian, L. et al., "Prognostic Impact of Myocardial Injury Related to Various Cardiac and Noncardiac Conditions", The American Journal of Medicine, vol. 129, pp. 506-514, (2016).
Pope, J.H. et al., "Missed diagnoses of acute cardiac ischemia in the emergency department", The New England Journal of Medicine, vol. 342, pp. 1163-1170, (2000).
Tatum, J.L. et al., "Comprehensive strategy for the evaluation and triage of the chest pain patient", Annals of Emergency Medicine, vol. 29, pp. 116-125, (1997).
Jneid, H. et al., "2017 AHA/ACC Clinical Performance and Quality Measures for Adults With ST-Elevation and Non-ST-Elevation Myocardial Infarction: A Report of the American College of Cardiology/American Heart Association Task Force on Performance Measures", Journal of the American College of Cardiology, vol. 70, pp. 2048-2090, (2017).
Bueno, H. et al., "Effect of thrombolytic therapy on the risk of cardiac rupture and mortality in older patients with first acute myocardial infarction", European Heart Journal, vol. 26, pp. 1705-1711, (2005).
Wallentin, L. et al., "Efficacy and safety of tenecteplase in combination with the low-molecular-weight heparin enoxaparin or unfractionated heparin in the prehospital setting: the Assessment of the Safety and Efficacy of a New Thrombolytic Regimen (ASSENT)-3 Plus randomized trial in acute myocardial infarction", Circulation, vol. 108, pp. 135-142, (2003).
Mehta, L.S., "Acute Myocardial Infarction in Women a Scientific Statement from the American Heart Association", Circulation, vol. 133, pp. 916-947, (2016).
Culic, V. et al., "Symptom presentation of acute myocardial infarction: Influence of sex, age, and risk factors", American Heart Journal, vol. 144, No. 6, pp. 1012-1017, (2002).
DeFilippis, A.P. et al., "Myocardial Infarction as a Clinical End Point in Research, What are we really talking about?", Circulation Research, vol. 124, No. 12, pp. 1701-1703, (2019).
Trainor, P.J. et al., "Systems characterization of differential plasma metabolome perturbations following thrombotic and non-thrombotic myocardial infarction", Journal of Proteomics, vol. 160, pp. 38-46, (2017).
Trainor, P.J. et al., "Wisdom of artificial crowds feature selection in untargeted metabolomics: An application to the development of a blood-based diagnostic test for thrombotic myocardial infarction", Journal of Biomedical Informatics, vol. 81, pp. 53-60, (2018).
Trainor, P.J. et al., "Evaluation of classifier performance for multiclass phenotype discrimination in untargeted metabolomics", Metabolites, vol. 7, No. 30, pp. 1-20, (2017).
Garbett, N.C. et al., "Characterization and classification of lupus patients based on plasma thermograms", PloS One, vol. 12, No. 11, pp. 1-11, (2017).
Kendrick, S.K. et al., "Application and interpretation of functional data analysis techniques to differential scanning calorimetry data from lupus patients", PloS one, vol. 12, No. 11, pp. 1-21, (2017).
Velazquez-Campoy, A. et al., "Thermal liquid biopsy for monitoring melanoma patients under surveillance during treatment: A pilot study", Biochimica et Biophysica acta General subjects, vol. 1862, issue 8, pp. 1701-1710, (2018).
Krumova, S. et al., "Intercriteria analysis of calorimetric data of blood serum proteome", Biochimica et Biophysica acta General subjects, vol. 1861, issue 2, pp. 409-417, (2017).
Todinova, S. et al., "Calorimetric markers for monitoring of multiple myeloma and waldenstrom's macroglobulinemia patients", European Biophysics Journal, vol. 47, pp. 549-559, (2018).
Todinova, S. et al., "Calorimetric markers of Bence Jones and nonsecretory multiple myeloma serum proteome", Analytical Chemistry, vol. 86, pp. 12355-12361, (2014).
Levine, G.N. et al., "2015 ACC/AHA/SCAI Focused Update on Primary Percutaneous Coronary Intervention for Patients With ST-Elevation Myocardial Infarction: An Update of the 2011 ACCF/AHA/SCAI Guideline for Percutaneous Coronary Intervention and the 2013 ACCF/AHA Guideline for the Management of ST-Elevation Myocardial Infarction", Circulation, vol. 133, No. 11, pp. 1135-1147 (2016).
Amsterdam, E. A., et al., "2014 AHA/ACC Guideline for the Management of Patients With Non-ST-Elevation Acute Coronary Syndromes", Circulation, vol. 130, No. 25, pp. e344-e426, (2014).
O'Gara, P.T., et al. "2013 ACCF/AHA Guideline for the Management of ST-Elevation Myocardial Infarction" Circulation, vol. 127, pp. 529-555, (2013).

(56) References Cited

OTHER PUBLICATIONS

Kramer, M.C. et al., "Relationship of thrombus healing to underlying plaque morphology in sudden coronary death", Journal of the American College of Cardiology, vol. 55, pp. 122-132, (2010).
Kramer, M.C. et al., "Presence of older thrombus is an independent predictor of long-term mortality in patients with ST-elevation myocardial infarction treated with thrombus aspiration during primary percutaneous coronary intervention", Circulation, vol. 118, pp. 1810-1816, (2008).
Thygesen, K. et al., "Third Universal Definition of Myocardial Infarction", Circulation, vol. 126, pp. 2020-2035, (2012).
Wagner, G.S. et al., "AHA/ACCF/HRS recommendations for the standardization and interpretation of the electrocardiogram: part VI: acute ischemia/infarction: a scientific statement from the American Heart Association Electrocardiogramhy and Arrhythmias Committee, Council on Clinical Cardiology; the American College of Cardiology Foundation; and the Heart Rhythm Society. Endorsed by the International Society for Computerized Electrocardiology", Journal of the American College of Cardiology, vol. 53, pp. 1003-1011, (2009).
Ambrose, J.A. et al., "Angiographic evolution of intracoronary thrombus and dissection following percutaneous transluminal coronary angioplasty (the Thrombolysis and Angioplasty in Unstable Angina [TAUSA] trial)", The American Journal of Cardiology, vol. 79, pp. 559-563, (1997).
Ambrose, J.A. et al., "Adjunctive thrombolytic therapy during angioplasty for ischemic rest angina. Results of the TAUSA trial", Circulation, vol. 90, pp. 69-77, (1994).
Ambrose, J.A. et al., "Angiography in unstable angina", The American Journal of Cardiology, vol. 68, pp. 78B-84B, (1991).
Capone, G. et al., "Frequency of intracoronary filling defects by angiography in angina pectoris at rest", The American Journal of Cardiology, vol. 56, pp. 403-406, (1985).
Dangas, G. et al., "Correlation of angiographic morphology and clinical presentation in unstable angina", Journal of the American College of Cardiology, vol. 29, pp. 519-525, (1997).
Gibson, C.M. et al., "Relationship of the TIMI myocardial perfusion grades, flow grades, frame count, and percutaneous coronary intervention to long-term outcomes after thrombolytic administration in acute myocardial infarction", Circulation, vol. 105, pp. 1909-1913, (2002).
Gibson, C.M. et al., "Relationship of TIMI myocardial perfusion grade to mortality after administration of thrombolytic drugs", Circulation, vol. 101, pp. 125-130, (2000).
Goldstein, J.A. et al., "Multiple complex coronary plaques in patients with acute myocardial infarction", The New England Journal of Medicine, vol. 343, pp. 915-922, (2000).
Zack, P.M. et al., "The occurrence of angiographically detected intracoronary thrombus in patients with unstable angina pectoris", American Heart Journal, vol. 108, pp. 1408-1412, (1984).
Kedra-Krolik, K. et al., "Blood serum calorimetry indicates the chemotherapeutic efficacy in lung cancer treatment", Scientific Reports, vol. 7, issue 1, art No. 16796, pp. 1-5, (2017).
Liaw, A. et al., "Classification and regression by randomForest", R News, vol. 2/3, pp. 18-22, (2002).
Qi, Y., "Random forest for bioinformatics", Ensemble Machine Learning Methods and Applications, chapter 11, pp. 307-323, (2012).
Denoyer, L. et al., "Deep sequential neural network", EWRL 2015—Workshop Deep Learning NIPS, pp. 1-9, (2014).
Ketkar, N., "Introduction to keras", Deep Learning with Python, pp. 95-109, (2017).
Fernandez-Delgado, M. et al., "Do we need hundreds of classifiers to solve real world classification problems?", Journal of Machine Learning Research, vol. 15, pp. 3133-3181, (2014).
Wang, L. et al., "Demonstration of MEMS-based differential scanning calorimetry for determining thermodynamic properties of biomolecules", Sensors and Actuators B: Chemical, vol. 134, pp. 953-958, (2008).

Yu, S. et al., "Review of MEMS differential scanning calorimetry for biomolecular study", Frontiers of Mechanical Engineering, vol. 12, No. 4, pp. 526-538, (2017).
Jia, Y. et al., "A polymer-based MEMS differential scanning calorimeter", Sensors and Actuators A: Physical; vol. 231, pp. 1-7, (2015).
Wang, B. et al., "MEMS-based AC differential scanning calorimetry", 2011 16th International Solid-State Sensors, Actuators and Microsystems Conference, pp. 1958-1961, (2011).
Wang, B. et al., "A MEMS differential scanning calorimeter for thermodynamic characterization of biomolecules", 2011 IEEE 24th International Conference on Micro Electro Mechanical Systems, pp. 821-824, (2011).
Wang, B. et al., "A MEMS differential-scanning-calorimetric sensor for thermodynamic characterization of biomolecules", Journal of Microelectromechanical Systems, vol. 21, No. 5, pp. 1165-1171, (2012).
Wang, L. et al., "A MEMS thermal biosensor for metabolic monitoring applications", Journal of Microelectromechanical Systems, vol. 17, No. 2, pp. 318-327, (2008).
Todinova, S. et al., "Blood plasma thermograms dataset analysis by means of intercriteria and correlation analyses for the case of colorectal cancer", International Journal Bioautomation, vol. 20, No. 1, pp. 115-124, (2016).
Michnik, A. et al., "Differences in cryostimulation and sauna effects on post-exercise changes in blood serum of athletes", Complementary Therapies in Medicine, vol. 51, pp. 1-6, (2020).
Lorinczy, D., et al., "Comparison of deconvoluted plasma DSC curves on patients with solid tumors", Journal of Thermal Analysis and Calorimetry, vol. 142, pp. 1243-1248. (2020).
Jaggi, R.D. et al., "Microfluidic depletion of red blood cells from whole blood in high-aspect-ratio microchannels", Microfluid, Nanofluidics, vol. 3, No. 1, pp. 47-53, (2007).
Rodriguez-Villarreal, A.I. et al., "High flow rate microfluidic device from blood plasma separation using a range of temperatures", Lab Chip, vol. 10, No. 2, pp. 211-219, (2010).
Kersaudy-Kerhoas, M. et al., "Validation of a blood plasma separation system by biomarker detection", Lab Chip, vol. 10, No. 12, pp. 1587-1595, (2010).
Tripathi, S. et al., "Blood plasma separation in elevated dimension t-shaped microchannel", Biomedical Microdevices, vol. 15, No. 3, pp. 415-425, (2013).
Lee, M.G. et al., "Inertial blood plasma separation in a contraction-expansion array microchannel", Applied Physics Letters, vol. 98, No. 25, pp. 253702-1-253702-3, (2011).
Blattert, C. et al., "Separation of blood in microchannel bends", The 26th Annual International Conference of the IEEE Engineering in Medicine and Biology Society, vol. 1, pp. 2627-2630, (2004).
Tripathi, S. et al., "Microdevice for plasma separation from whole human blood using bio-physical and geometrical effects", Science Reports, vol. 6, pp. 1-15, (2016).
Prabhakar, A. et al., "A novel, compact and efficient microchannel arrangement with multiple hydrodynamic effects for blood plasma separation", Microfluidics and Nanofluidics, vol. 18, No. 5-6, pp. 995-1006, (2015).
Kersaudy-Kerhoas, M. et al., "Micro-scale blood plasma separation: from acoustophoresis to egg-beaters", Lab on a Chip, vol. 13, No. 17, pp. 3323-3346, (2013).
Tripathi, S. et al., "Passive blood plasma separation at the microscale: A review of design principles and microdevices", Journal of Micromechanics and Microengineering, vol. 25, No. 8, pp. 1-24, (2015).
Yu, Z.T.F. et al., "Microfluidic blood cell preparation: now and beyond", Small, vol. 10, No. 9, pp. 1687-1703, (2014).
Wu, D. et al., "How long can we store blood samples: a systematic review and meta-analysis", EBioMedicine, vol. 24, pp. 277-285, (2017).
Dean, L., "Blood groups and red cell antigens", National Center for Biotechnology Information, pp. 1-86, (2005).
Laser, D. J. et al., "A review of micropumps", Journal of Micromechanics and Microengineering, vol. 14, pp. R35-R64 (2004).

(56) References Cited

OTHER PUBLICATIONS

Au, A.K. et al., "Mail-order microfluidics: evaluation of stereolithography for the production of microfluidic devices", Lab on a Chip, vol. 7, pp. 1294-1301, (2014).
Au, A.K. et al., "3D-printed microfluidic automation", Lab on a Chip, vol. 15, No. 8, pp. 1934-1941, (2015).
Lee, Y.S. et al., "3D-printed Quake-style microvalves and micropumps", Lab on a Chip, vol. 18, No. 8, pp. 1207-1214 (2018).
Melvin, A.M. et al., "Modeling 3D printed check valves for microfluidic systems", 2018 IEEE International Symposium on Signal Processing and Information Technology (ISSPIT), pp. 179-184, (2018).
Buscaglia, R. et al., "Segment-wise nonparametric classification of multivariate functional data: lupus identification using plasma thermograms", Journal of Applied Statistics, pp. 1-47, (2018).
Aguilera, A.M. et al., "Functional analysis of chemometric data", Open Journal of Statistics, vol. 3, pp. 334-343, (2013).
Wallig, M. et al., "Foreach parallel adaptor for the parallel package", Microsoft Corporation R package version 1, pp. 1-4, (2020).
Berrendero, J.R. et al., "Variable selection in functional data classification: a maxima-hunting proposal", Statistica Sinica, vol. 26, pp. 619-638, (2016).
Caruana, R. et al., "Ensemble selection from libraries of models", Proceedings of the twenty-first international conference on Machine learning, ACM, pp. 1-8, (2004).
Delaigle, A. et al., "Componentwise classification and clustering of functional data", Biometrika, vol. 99, pp. 299-313, (2012).
Dietterich, T.G. et al., "Ensemble methods in machine learning", International Workshop on Multiple Classifier Systems, pp. 1-15, (2000).
Dietterich, T.G., "Ensemble learning", The handbook of brain theory and neural networks, pp. 405-408. (2002).
Dudani, S.A., "The distance-weighted k-nearest-neighbor rule", IEEE Transactions on Systems, Man and Cybernetics, pp. 325-327, (1976).
Febrero-Bande, M. et al., "Statistical computing in functional data analysis: The R package fda.usa", Journal of Statistical Software, vol. 51, pp. 1-28, (2012).
Ferraty, F. et al., "Curves discrimination: a nonparametric functional approach", Computational Statistics & Data Analysis, vol. 44, pp. 161-173, (2003).
Gul, A. et al., "Ensemble of a subset of kNN classifiers", Advances in Data Analysis and Classification, vol. 12, pp. 827-840, (2016).
Hastie, T. et al., "Penalized discriminant analysis", The Annals of Statistics, vol. 23, pp. 73-102, (1995).
Hechenbichler, K. et al., "Weighted k-nearest-neighbor techniques and ordinal classification", Sonderforschungsbereich, vol. 386, paper 399, pp. 1-16, (2004).
Kohavi, R. et al., "Wrappers for feature subset selection", Artificial Intelligence, vol. 97, pp. 273-324, (1997).
Krier, C. et al., "Supervised variable clustering for classification of NIR spectra", Proceedings of the 17$^{th}$ European Symposium on Artificial Neural Networks—Advances in Computational Intelligence and Learning (ESANN 2009), pp. 263-268, (2009).
Li, B. et al., "Classification of functional data: A segmentation approach", Computational Statistics & Data Analysis, vol. 52, pp. 4790-4800, (2008).
Muller, K.R. et al., "An introduction to kernel-based learning algorithms", IEEE Transactions on Neural Networks, vol. 12, No. 2, pp. 181-201, (2001).
Parzen, E. "On estimation of a probability density function and mode", The Annals of Mathematical Statistics, vol. 33, issue 3, pp. 1065-1076, (1962).
Porro-Munoz, D. et al., "Dissimilarity representation on functional spectral data for classification", Journal of Chemometrics, vol. 25, No. 9-10, pp. 476-486, (2011).
Ristoski, P. et al., "Feature selection in hierarchical feature spaces", International Conference on Discovery Science, 17$^{th}$ International Conference, pp. 288-300, (2014).
Rizwan, M. et al., Comparison of Distance Metrics for Phoneme Classification based on Deep Neural Network Features and Weighted k-NN Classifier, Georgia Institute of Technology, pp. 1-5, (2014).
Rokach, L., "Ensemble-based classifiers", Artificial Intelligence Review, vol. 33, pp. 1-39, (2010).
Tibshirani, R. et al., "Sparsity and smoothness via the fused lasso", Journal of the Royal Statistical Society: Series B (Statistical Methodology), vol. 67, part 1, pp. 91-108, (2005).
Yang, P. et al., "A review of ensemble methods in bioinformatics", Current Bioinformatics, vol. 5, pp. 296-308. (2010).
Cambon, A.C. et al., "Classification of clinical outcomes using high-throughput informatics: Part 1—nonparametric method reviews", Model Assisted Statistics and Applications, vol. 10, pp. 3-23, (2015).
Cambon, A.C. et al., "Classification of clinical outcomes using high-throughput informatics: Part 2—parametric method reviews", Model Assisted Statistics and Applications, vol. 10, pp. 89-107, (2015).
Melvin, A. et al., "Design and simulation of 3D printed check valves using fluid-structure interaction", 1 page, Aug. 2018, (Poster).
Melvin, A. et al., "A 3D printed microfluidic manifold to separate plasma from whole blood", GSC Presentation, 1 Page, Poster, Feb. 28, 2019.
Melvin, A. et al., "A 3D printed microfluidic manifold to separate plasma from whole blood", GSC Presentation, pp. 1-15, Feb. 28, 2019.
Braun, M.M. et al., "Stable coronary artery disease: Treatment", American Family Physician, vol. 97, No. 6, pp. 376-384, (2018).
Schneider, G. et al., "The utility of differential scanning calorimetry curves of blood plasma for diagnosis, subtype differentiation and predicted survival in lung cancer", Cancers, vol. 13, No. 5326, pp. 1-23. (2021).
44, Mar. 22, 2024, U.S. Appl. No. 17/080,805, US.
30, Sep. 3, 2024, U.S. Appl. No. 15/764,458, US.
U.S. Appl. No. 18/523,208, filed Nov. 29, 2023.

\* cited by examiner

MICROFLUIDIC MANIFOLD AND METHODS OF USE THEREOF

BACKGROUND

The isolation of blood plasma, essentially the extracellular matrix of the larger blood cells, from whole blood is one of the most basic yet vital steps for many diagnostic techniques. The yellowish liquid contains important biomarkers (primarily plasma proteins) that have been shown to provide unique diagnostic and therapeutic characteristics. Liquid plasma is isolated (extracted) from whole blood to remove the larger cellular blood contents (red blood cells, white blood cells, etc.) the presence of which complicates sample analysis and analyte detection Recent studies have attempted to isolate blood plasma using microfluidic devices. Although several microfluidic devices that extract plasma are found in the literature, few have used undiluted whole blood directly. These microfluidic devices generally suffer from low plasma yield and low separation efficiency, resulting in impure samples that require further processing. Additionally, no studies have diluted extracted plasma directly within a microfluidic device.

SUMMARY

In a first aspect, the invention is an extraction chamber including a main channel, a plasma channel, and a plurality of side channels fluidly connecting the main channel to the plasma channel. Each of the plurality of side channels has an average diameter of at most 200 μm at a narrowest cross section, and the extraction chamber has a separation efficiency of at least 95%.

In a second aspect, the invention is a multilevel extraction chamber, including a main channel, a secondary channel fluidly connected to the main channel, a plasma channel fluidly connected to the secondary channel, a first set of a plurality of side channels fluidly connecting the main channel to the secondary channel, and a second set of a plurality of side channels fluidly connecting the secondary channel to the plasma channel. Each of the first set of side channels has an average diameter that is greater than the average diameter of each of the second set of side channels, and the extraction chamber has a separation efficiency of at least 95%.

Definitions

The term "separation efficiency" refers to the percentage of particles present in whole blood that enter the main channel but do not enter the plasma channels of an extraction chamber device. This can also be referred to as "purity". A separation efficiency is preferably at least 95%, more preferably at least 99%.

All percentages (%) are weight/weight percentages, unless stated otherwise.

"Cellular tissue" refers to cellular blood contents such as red blood cells and white blood cells. Cellular tissue may also be referred to as "cellular contents" or "cellular components".

"Average diameter" is the diameter of a circle with the same area as the cross-section of the channel including only those parts which allow fluid to flow (that is, reduced by the portion of the channel taken up by an obstruction), and applies even when the cross-section of the channel is not a circle.

BRIEF DESCRIPTION OF THE DRAWINGS

The invention can be better understood with reference to the following drawings and description.

DETAILED DESCRIPTION

The present invention includes a microfluidic manifold that is capable of separating plasma from whole blood using a three-dimensional structure to extract, and dilute for differential scanning calorimetry (DSC) analysis, or other uses. The microfluidic manifold includes a plasma extraction chamber that separates plasma from whole blood, and a dilution chamber that dilutes the plasma to prepare a diluted plasma sample. The microfluidic manifold may optionally include an internal flow rectification mechanism in the plasma extraction chamber, or the dilution chamber, and/or the connection between the two.

The plasma extraction chamber is designed to eliminate cellular and cellular fragment blood components (for example, white blood cells, red blood cells, and platelets) leading to a plasma sample. The plasma extraction chamber focuses on fully preparing the sample, at the point of use, so it can be used for diagnostics. After a plasma sample is obtained, the dilution chamber portion of the manifold dilutes the plasma sample, and provides a diluted plasma sample. Importantly, the manifold can fully prepare a diluted plasma sample from whole blood, that is at an appropriate concentration for conducting testing on the diluted plasma sample. The microfluidic manifold is disposable and may be used in low-resource areas to provide a cost-effective, fast and simple method to help prepare samples.

Figure 1:
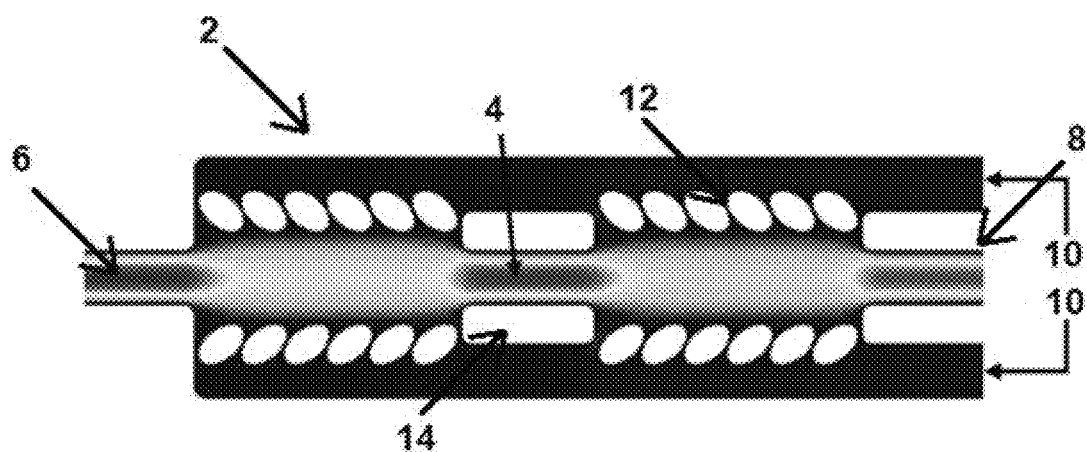
FIG. 1 illustrates a design of a plasma extraction chamber.

FIG. 1 illustrates an extraction chamber, 2, shown in cross section. The extraction chamber includes a main channel, 4. The main channel includes an inlet, 6 and an outlet, 8. The extraction chamber is configured to allow whole blood to enter the inlet. The extraction chamber includes at least one plasma channel, 10. The plasma channel is fluidly connected to the main channel, via a plurality of side channels, 12. The plasma that is present in the whole blood sample passes through the side channels and enters the plasma channel, 10, leaving cells behind in the main channel. The main channel optionally includes obstructions, 14 to selectively speed up the fluid flow through the channel, as illustrated by the darker portion of the fluid flow. Obstructions may be included along the main channel to increase the velocity of flow regionally and force more of the carrier medium (plasma) into the smaller side channels.

The extraction chamber separates the plasma from large particles (compared to plasma proteins). The large particles will be carried through the main channel, and due to their momentum, will not flow laterally into the side channels. The flow along the side of the main channel is slower than the central portion of the main channel, and by capillary action, the filling of this region of the main channel will provide cell-free plasma via this geometric barrier. The size of the side channels as well as the angle between the main channel and the side channel can be selected to choose the size exclusion of the cellular contents.

Figure 2:
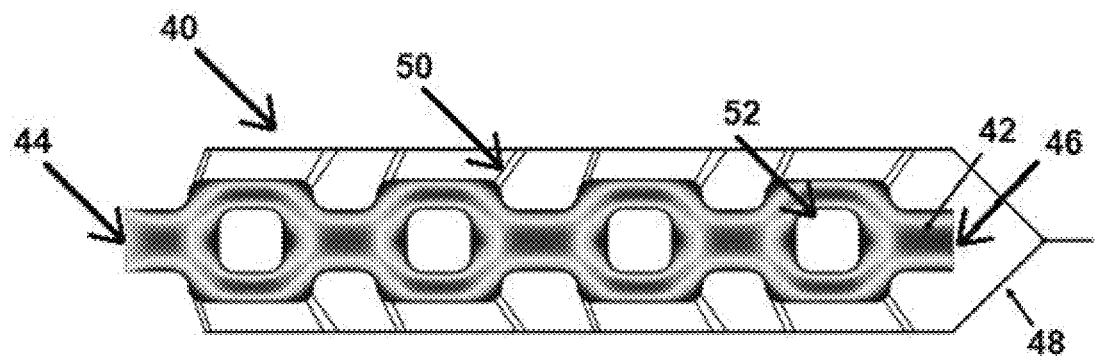
FIG. 2 illustrates an alternative design of a plasma extraction chamber.

FIG. 2 is a schematic of an alternative configuration of an extraction chamber 40, having a main channel, 42. The main channel includes an inlet, 44 and an outlet 46. The extraction chamber includes at least one plasma channel, 48. The plasma channel is fluidly connected to the main channel via a plurality of side channels, 50. The main channel optionally includes obstructions, 52 to selectively speed up the fluid flow through the channel, as illustrated by the darker portion of the fluid flow.

Figure 3:
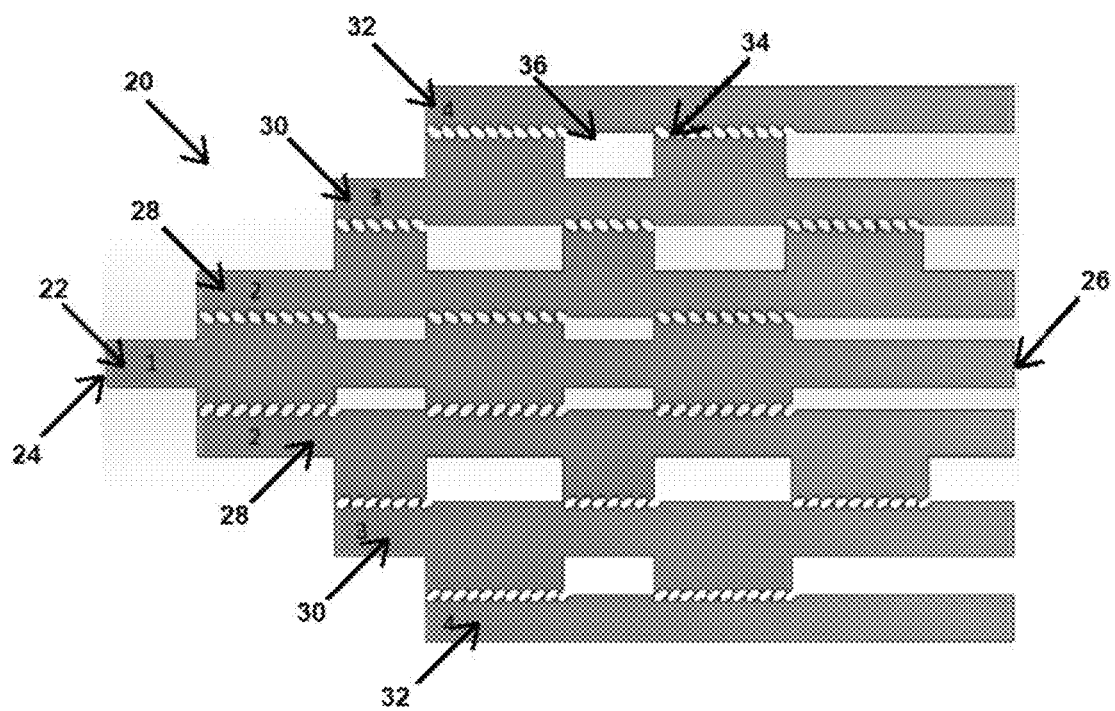
FIG. 3 illustrates a multilevel plasma extraction chamber.

FIG. 3 illustrates a multilevel extraction chamber, 20 shown in cross section. The multilevel extraction chamber includes a main channel, 22, with an inlet, 24 and an outlet 26. The extraction chamber includes at least one plasma channel, 32. The extraction chamber also includes a secondary channel, 28 and optionally a tertiary channel 30. The extraction chamber is configured for whole blood to enter the main channel, 22, where the cellular components remain in the main channel, and plasma passes through a plurality of side channels, 34, into the secondary channel, 28. The plasma passes through additional side channels, 34 until the plasma enters the plasma channel. The main channel and/or the secondary channel may optionally include an obstruction, 36. The multilevel extraction chamber will reduce the amount of stress applied on cells within the sample by performing a multiple level separation. Additional channels may be included in the multilevel extraction chamber. The extraction chamber design incorporated multiple separations to extract all components found in blood. As shown in FIG. 3, Channel 1—main channel. Channel 2—particles<10 μm. Channel 3—particles<6 μm. Channel 4—particles<1 μm.

The main channel of the extraction chamber may have an average diameter of 0.1 mm to 10 mm, preferably the main channel has an average diameter of 0.2 mm to 5 mm, for example, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.25, 2.5, 2.75, 3.0, 3.25, 3.5, 3.75, 4.0, 4.25, 4.5, 4.75, or 5.0 mm. The average diameter of the main channel may not be uniform along the main channel flow path. The average diameter may be reduced by selective placement of obstructions along the flow path. The length of the main channel may be 10 mm to 100 mm, preferably the length is 1, 2, 3, 4, 5, 6, 7, 8, 9, 10, 11, 12, 13, 14, 15, 16, 17, 18, 19, or 20 mm.

There may be a plurality of obstructions along the main channel to speed up portions of the main channel flow path. The main channel may include 1 to 100 obstructions, preferably, 1, 2, 3, 4, 5, 6, 7, 8, 9, 10, 11, 12, 13, 14, 15, 16, 17, 18, 19 or 20 obstructions. The obstructions may reduce the average diameter of a channel by 0.1 mm to 10 mm, preferably by 0.2 mm to 5 mm, for example, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.25, 2.5, 2.75, 3.0, 3.25, 3.5, 3.75, 4.0, 4.25, 4.5, 4.75, or 5.0 mm.

The plasma channel may have an average diameter of 1 to 1000 μm, preferably the plasma channel has an average diameter of 4 to 400 μm, for example 5, 10, 15, 20, 25, 30, 35, 40, 45, 50, 55, 60, 65, 70, 75, 80, 85, 90, 95 or 100 μm. Most preferably the diameter is 30, 31, 32, 33, 34, 35, 36, 37, 38, 39, 40, 41, 42, 43, 44, 45, 46, 47, 48, 49, or 50 μm.

The side channels may have an average diameter of 1 to 200 μm, preferably the side channels have an average diameter of 4 to 100 μm, for example, 5, 10, 15, 20, 25, 30, 35, 40, 45, 50, 55, 60, 65, 70, 75, 80, 85, 90, 95 or 100 μm. Most preferably the average diameter is 5, 6, 7, 8, 9, 10, 11, 12, 13, 14, 15, 16, 17, 18, 19, 20, 21, 22, 23, 24, 25, 26, 27, 28, 29, or 30 μm. In a multilevel plasma extraction chamber the side channels that fluidly connect the main channel and secondary channel may be larger than the side channels that fluidly connect the secondary channel to the plasma channel. The number of side channels that is present in a device may be 2 to 10,000, preferably 5-1000, including 6, 7, 8, 9, 10, 11, 12, 13, 14, 15, 16, 17, 18, 19, 20, 25, 30, 35, 40, 45, 50, 100, 200, 300, 400 and 500. Many channels are included in case clogging occurs in the early channels over the course of the injection of the blood sample. The angle of the side channels in relation to the main channel may be 90 degrees. The angle of the side channel may also be 5, 10, 15, 20, 25, 30, 35, 40, 45, 50, 55, 60, 65, 70, 75, 80, or 85 degrees in relation to the main channel.

The main channel, the plurality of side channels and the plasma channel may optionally be coated with a substance to prevent clogging. For example, a mixture of heparin and glutaraldehyde has been shown to have hydrophilic and anticoagulating properties.

A sample of whole blood or diluted whole blood may be pumped into an extraction chamber by any suitable means, for example a syringe. The sample is injected into an extraction chamber to extract a fractional volume of plasma with a minimal quantity of cellular components. The principles that enable this phenomenon are laminar flow and momentum. The low flow rates in the channels assures that no turbulent mixing will occur, so streamlines form within the main flow channel.

Figure 4:
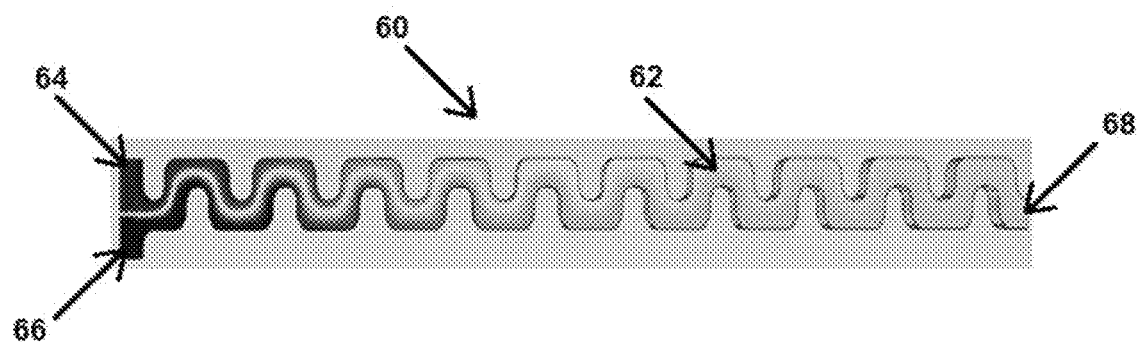
FIG. 4 illustrates a dilution chamber.

FIG. 4 illustrates a dilution chamber, 60. The dilution chamber includes a dilution channel, 62. A plasma sample enters the dilution channel via a plasma inlet, 64. A dilutant enters the dilution channel via a dilutant inlet, 66. The diluted plasma passes through the dilution channel and exits through the diluted plasma outlet, 68. The dilution channel provides a passive mixing mechanism. The dilution channel may include bends to provide a greater path length than the linear length of the dilution chamber.

The average diameter of the dilution channel may be 20 μm to 50 mm, preferably 25, 30, 35, 40, 45, 50, 60, 70, 80, 90, 100, 150, 200, 300, 400, 500, 600, 700, 800, or 900 μm, or alternatively 1, 2, 3, 4, 5, 6, 7, 8, 9, 10, 11, 12, 13, 14, 15, 16, 17, 18, 19 or 20 mm. The length of the dilution channel may be 1 to 100 mm, preferably 1, 2, 3, 4, 5, 6, 7, 8, 9, 10, 20, 30, 40, 50, 60, 70, 80, 90 or 100 mm.

Figure 5:
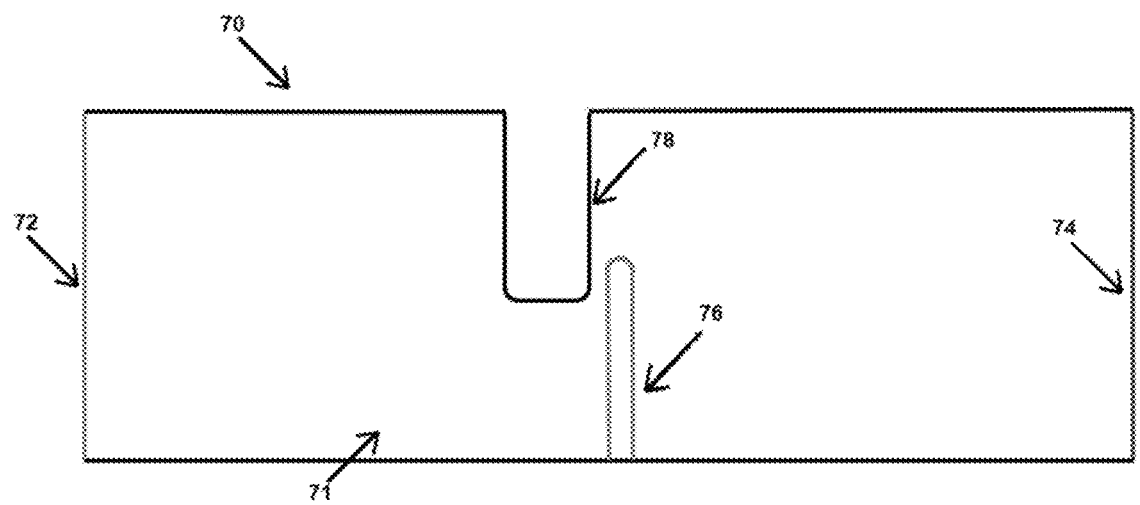
FIG. 5 illustrates a channel including an internal flow rectification mechanism

FIG. 5 illustrates a portion of a channel having an internal flow rectification mechanism, 70 to ensure that fluid flows in only one direction. The channel, 71 includes an inlet, 72 and an outlet, 74. Along the flow path of the channel, an actuated valve, 76 prevents the possibility of backflow in cooperation with a valve stop, 78. The actuated valve allows for fluid movement through the channel from the inlet, 72 to the outlet, 74, but prevents backflow because the actuated valve is held against the valve stop if the pressure is greater on the side of the valve that is closer to the outlet. The internal flow rectification mechanism may be included along the dilution channel of the dilution chamber, between the extraction chamber and the dilution chamber, at inlets and/or at outlets.

Figure 6:
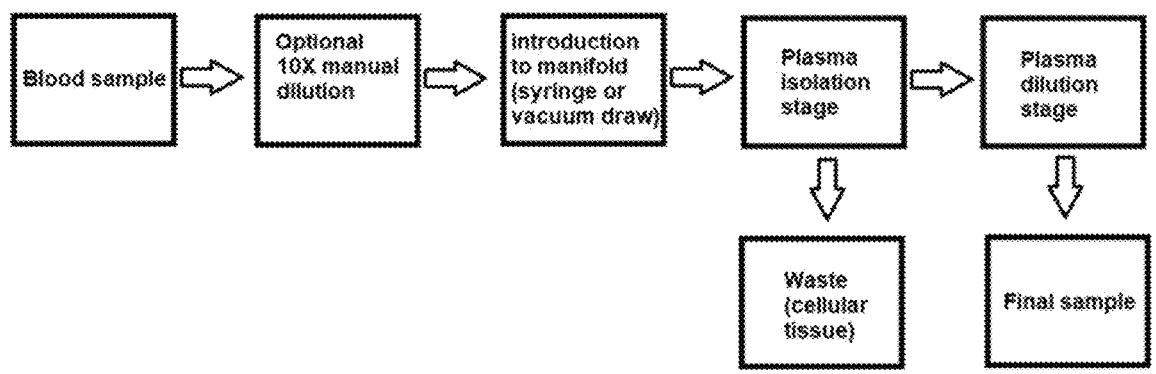
FIG. 6 is a flow chart of the general steps of preparing a plasma sample for a differential scanning calorimetry sensor.

FIG. 6 illustrates a flow chart of a process for preparing a plasma sample. The method includes taking a sample of whole blood, optionally diluting this sample by, for example, 10×, sending this volume through the extraction chamber, then through a final dilution step in the dilution chamber, to obtain diluted plasma, for example 25× diluted plasma. These dilutions should reduce the concentration of blood proteins down to a concentration typical for commercial DSC instrumentation (~1 mg/mL). The modularity of this setup allows the technology to be applied for specific applications beyond DSC where different dilutions of plasma may be required.

The extraction chamber and dilution chamber may be made of any soft polymer. Examples of suitable polymers include polylactic acid (PLA), acrylonitrile butadiene styrene (ABS), nylon, polyethylene terephthalate glycol-modified (PETG), thermoplastic polyurethane (TPU) and polydimethylsiloxane (PDMS).

The extraction chamber and dilution chamber may be formed using any suitable polymer manufacturing process. Examples of suitable polymer manufacturing processes include 3D printing (also known as additive manufacturing), soft lithography and projection micro-stereolithography (SLA 3D printing). The dilution chamber may also be formed by extrusion or injection molding.

Details of patients from whom samples may be obtained, processing of whole blood samples to obtain plasma for testing, the dilution and other preparation of plasma for testing, and the interpretation of thermograms, may be found in patent application publications, including PCT publication nos. WO 2008/089072, WO 2010/033606 and WO 2011/156658, as well as US Pat. Pub. No. US 2018/0277250, the relevant content of which are hereby incorporated by reference.

EXAMPLES

Example 1—Computer Simulations

Flow simulations were performed in COMSOL Multiphysics (Comsol, Inc., Boston, MA). Particle tracing was used to investigate cell separation. Diluted species transport was used to determine the mixing efficiency of two liquids with different concentrations. Fluid-structure interaction (FSI) was used to simulate a check valve with a 3D printed microfluidic system.

Computer simulations of the extraction chamber and dilution chamber were performed. Flow simulations were performed to determine proper extraction chamber geometry and flow configurations. A particle tracing module was used to investigate the separation of 10,000 particles (diameter 6-8 μm, similar to red blood cells) in a fluid that simulates the viscosity of blood. A constriction-expansion channel design focused the flow and increased the cell free (plasma) layer.

Figure 7:
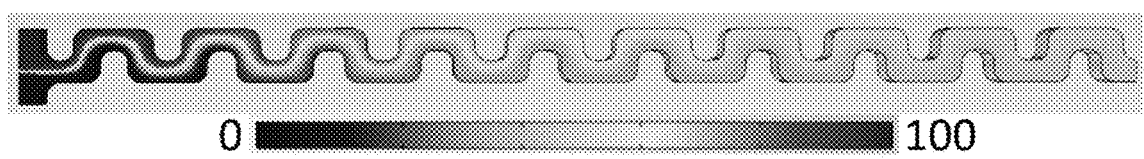
FIG. 7 is a 3D simulation showing two chemicals mixing together with inlet velocities of 5 mm/s.
Figure 8:
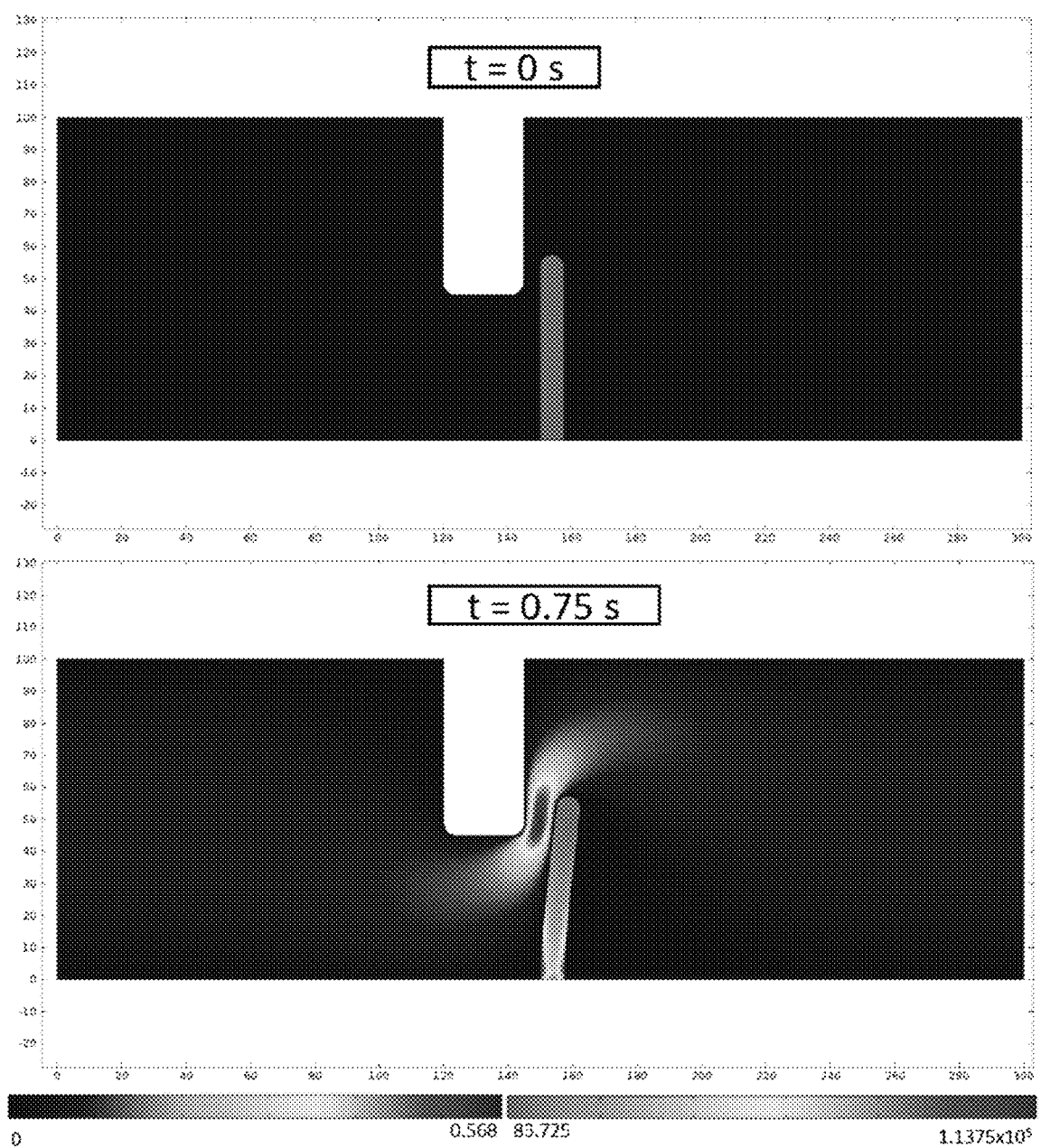
FIG. 8 is a graph of transient simulation of valve actuation showing surface von Mises stresses and surface velocity magnitude at 0 sec and 0.75 sec for a TPU valve with a width of 7.5 μm.
Figure 9:
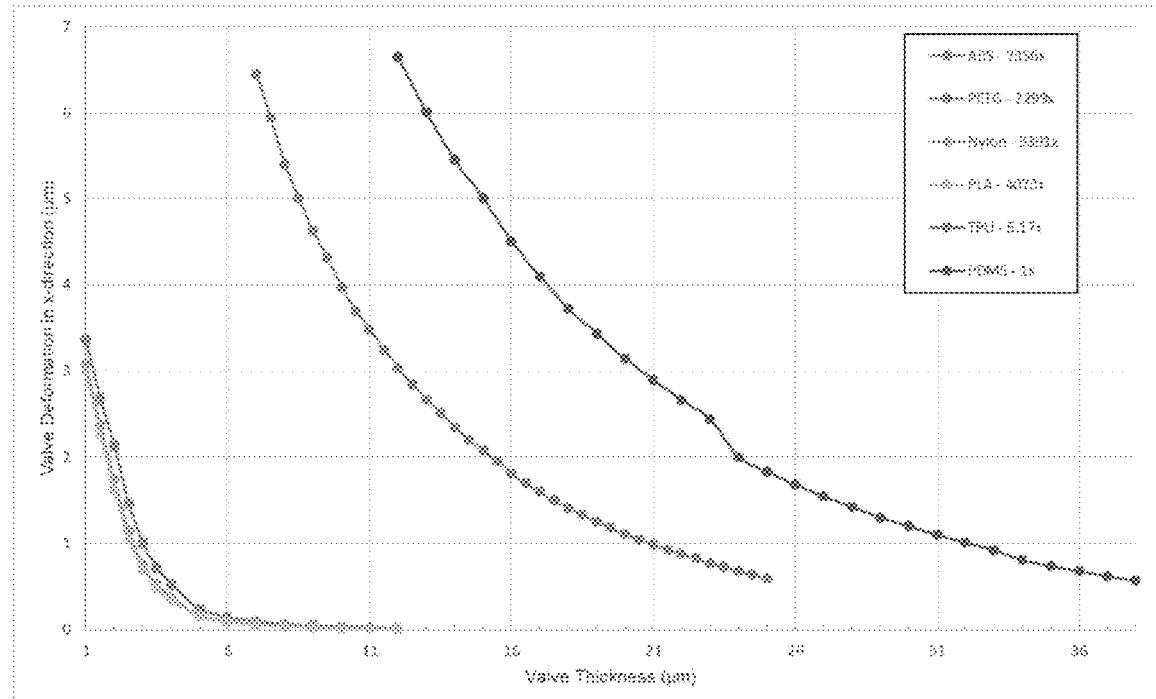
FIG. 9 is a graph illustrating the maximum valve deformation of 3D printer filaments made of PLA, ABS, nylon, PETG, TPU and PDMS.
Figure 10:
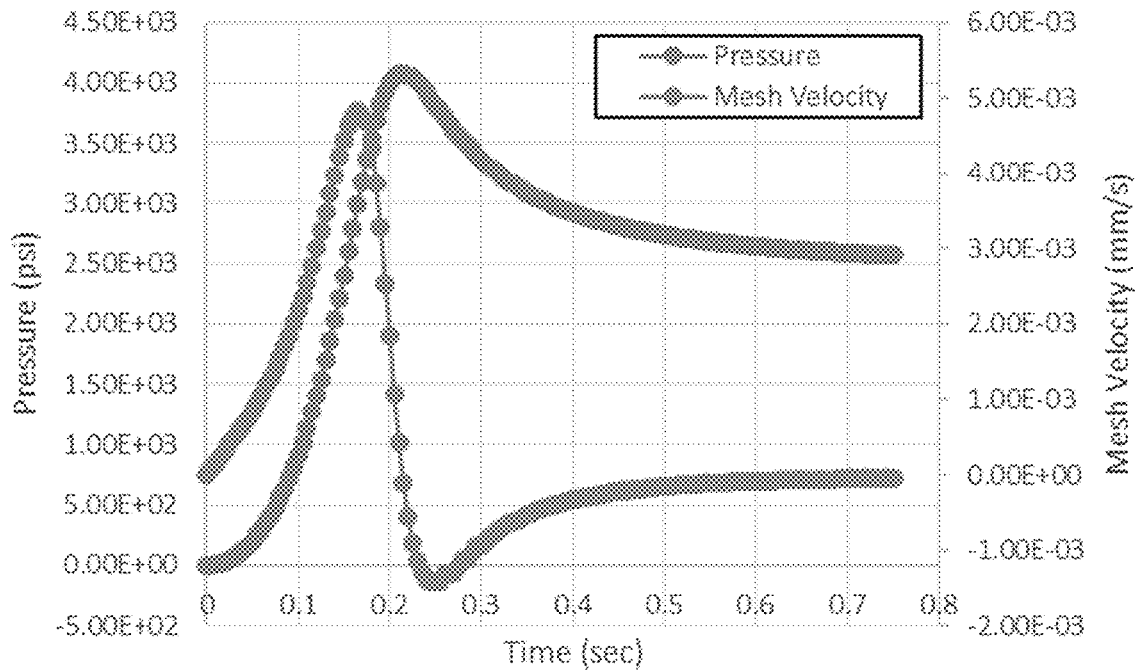
FIG. 10 is a graph illustrating solid deformation mesh velocity and pressure versus time for an ABS valve.
Figure 11:
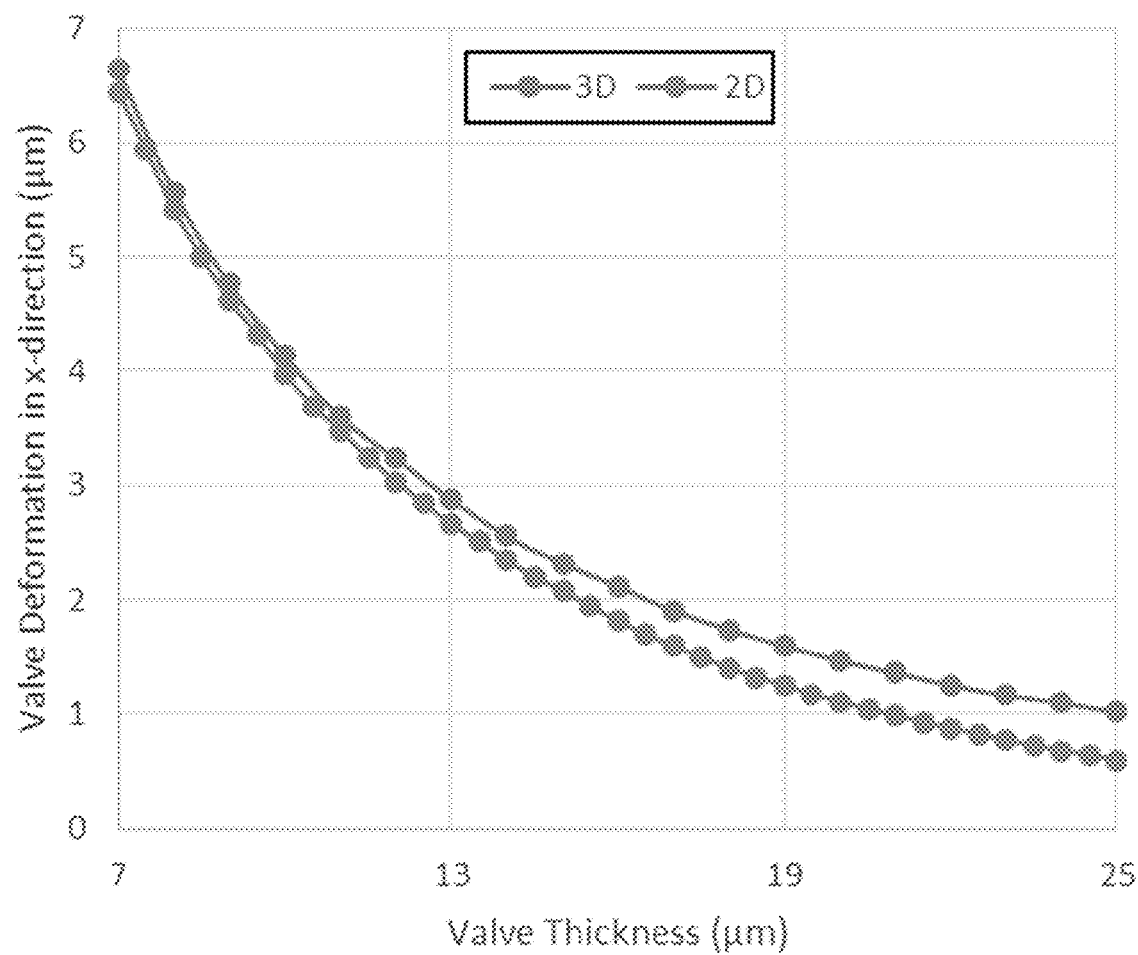
FIG. 11 is a graph illustrating a comparison of TPU valve deformation in 2D and 3D simulations.

A dilution chamber, including a meandering dilution channel, mixed two liquids of differing concentrations (plasma and diluent, typically phosphate buffered saline). Fluid-structure interaction methods were used to simulate a flow-damping check valve within a 3D printed microfluidic channel. FIG. 7 is a 3D simulation showing two chemicals mixing together with inlet velocities of 5 mm/s.

Example 2—Check Valve Design and Simulation Using Fluid-Structure Interaction

Passive, one-way valves (check valves) are an essential microfluidic feature that facilitates flow rectification. Numerous check valves have been demonstrated in microfluidic systems using PDMS due to its low Young's modulus (0.87 MPa). Recently, 3D printing has become of interest to microfluidics as it accelerates development while reducing time and cost. This study analyzed the range of valve thicknesses necessary to promote flow and deliver precisely controlled volume droplets for five commonly available 3D fused deposition modeling (FDM) printer filament materials.

Figure 12:
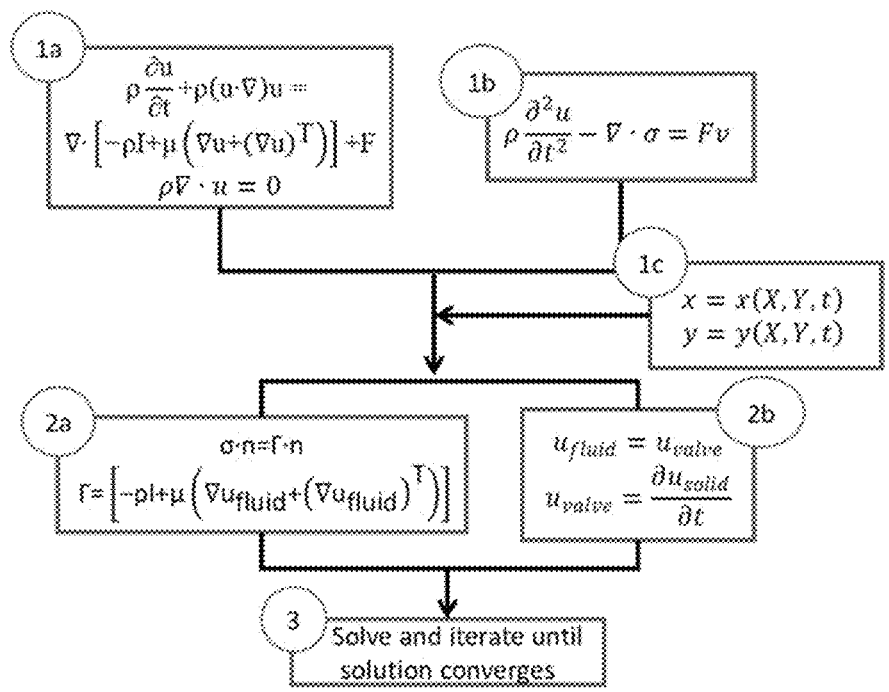
FIG. 12 is a flow chart that graphically outlines the governing equations for fluid-structure interaction.

A representative 2D computational fluid dynamics (CFD) model was created in COMSOL Multiphysics® and fully coupled using the fluid-structure interaction (FSI) module. FIG. 12 is a flow chart that graphically outlines the governing equations for FSI. The FSI process includes setting up equations for fluid flow (step 1*a*), solid deformation (step 1*b*) and moving mesh (step 1*c*); applying boundary conditions for fluid forces (step 2*a*) and fluid velocities (step 2*b*); and solving the system of equations and iterating until the solution converges.

Five 3D printer filament materials were compared in simulations of valve deformation over a 0.75 second transient period using the material properties of PDMS as a baseline. The velocity profile boundary condition was assigned as fully developed laminar flow entering the channel using the following equation:

$$v_i = u_{mean} \times 6 \times (H - Y) \times \frac{Y}{H^2}; u_{mean} = \frac{U \times t^2}{\sqrt{t^4 - 0.07t^2 + 0.0016}}$$

Where $v_i$ is velocity; $u_{mean}$ is centerline velocity; H is the height of the channel; Y is the length of the channel; U is inlet velocity; and t is time.

Several valve designs were simulated to observe theoretical deflection for various thicknesses and material properties for several common 3D printer materials. Table 1 below illustrates the properties of the materials tested:

TABLE 1

| | Material properties | | |
|---|---|---|---|
| Material | ρ (kg/m³) | ν | E (Pa) |
| PLA | 1250 | 0.33 | $3.5 \times 10^9$ |
| ABS | 1100 | 0.35 | $2.05 \times 10^9$ |
| Nylon | 1130 | 0.39 | $2.95 \times 10^9$ |
| PETG | 1260 | 0.40 | $2.0 \times 10^9$ |
| TPU | 1100 | 0.40 | $4.5 \times 10^6$ |
| PDMS | 0.97 | 0.40 | $0.87 \times 10^6$ |

The maximum valve deflection for ABS, nylon, PETG, PLA, and TPU was 3.34, 3.08, 3.37, 3.00, and 6.45 μm, respectively. The simulation resulted in a maximum valve deformation of 6.65 μm for PDMS. The results are illustrated in FIGS. 8-11.

Materials with a Young's modulus close to PDMS allowed valve structures to actuate with adequate forward flow. TPU exhibited similar deformations to PDMS but required smaller valve widths.

Example 3—Manifold Testing

The simulated designs of the plasma extraction chamber and dilution chamber were exported into solid modeling software and inlets and outlets were added. Each component was printed using polylactic acid (PLA) on a FDM printer. Fluid samples were introduced to the extraction chamber using a syringe pump, controlled using a digital servo coupled to a 3 ml syringe by a linkage. A pressure sensor was incorporated to monitor the amount of pressure entering the microfluidic chamber. The particle tracing module reported less than 1% of particles entered the plasma channels, indicating a high separation efficiency.

Figure 13:
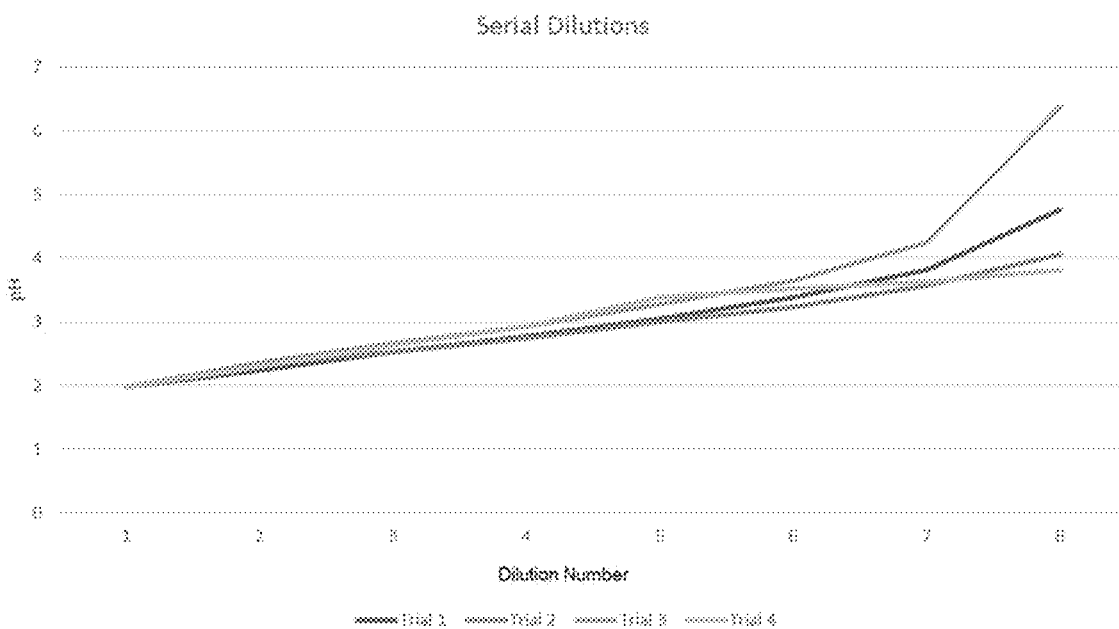
FIG. 13 is a graph showing the results of serial nitric acid dilutions.

A dilution chamber was 3D printed with PLA and tested with 2 different dye solutions. The mixing ratio was altered by changing the inlet velocities. Various dilutions studies were carried out. Yellow and blue dye solutions were mixed and diluted at a range of 8:1 to 1:8 (yellow:blue) using the dilution chamber. Serial and controlled nitric acid dilutions were also performed. Two 3 mL syringes were used. One was filled with DI water while the other was filled 10 mM nitric acid. The syringe pump ran and expelled the liquid from both syringes. The resulting mixture was measured with a pH meter. That mixture was then drawn up (roughly half of it) into a 3 ml syringe for the nitric acid and the other 3 ml syringe was filled with DI water. This process was repeated so a total of 8 dilutions were performed. FIG. 13 is a graph showing the change in pH over 8 serial nitric acid dilutions.

Figure 14:
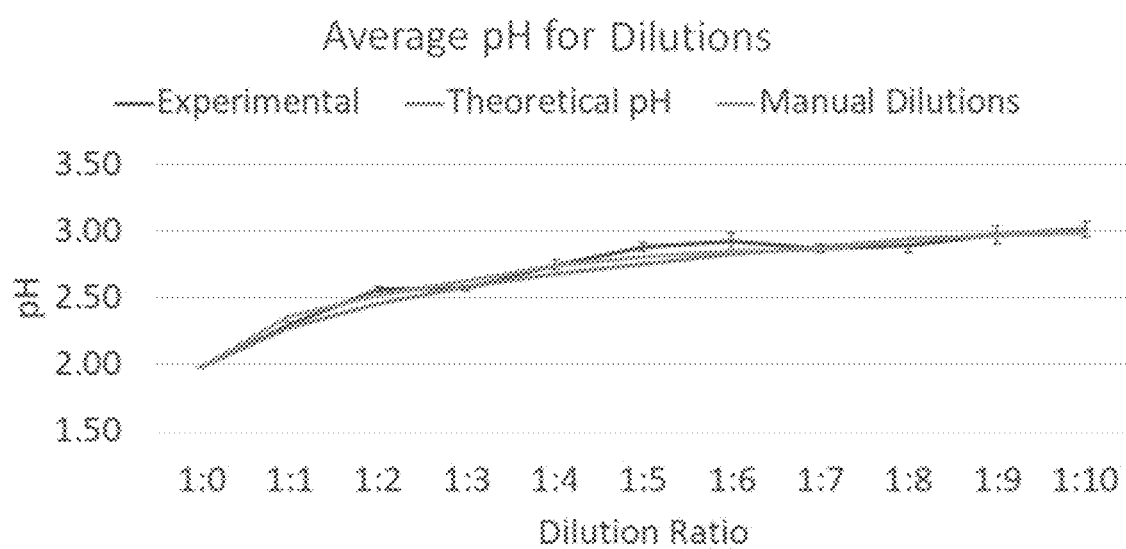
FIG. 14 is a graph showing the results of controlled nitric acid dilutions.

FIG. 14 is a graph showing the change in pH of a series of nitric acid and water mixing experiments. Controlled mixing of different volumes of acid and water was performed to yield a series of acid:water mixtures ranging from mixing ratios of 1:0 acid:water to mixing volumes of 1:30 acid:water. The amount of mixing within the channel was controlled by altering inlet velocity and by adjusting channel inlet geometries. The error bars in the graph represent 1 standard deviation, with a sample size of 3.

The check valve described in Example 2, also referred to as an internal flow rectification mechanism, was also produced using 3D printing. The check valve validated the computer modeling of Example 2. The 3D printer materials with sufficiently low Young's modulus allow sufficient actuation of the valve at approximately 70 μm/s to allow forward flow.

REFERENCES

1. Jaggi, R. D. et al., "Microfluidic depletion of red blood cells from whole blood in high-aspect-ratio microchannels", Microfluidics and Nanofluidics, vol. 3, no. 1, pp. 47-53 (2007).
2. Rodriguez-Villarreal, A. I. et al., "High flow rate microfluidic device for blood plasma separation using a range of temperatures", Lab on a Chip, vol. 10, no. 2, pp. 211-219 (2010).
3. Kersaudy-Kerhoas, M. et al., "Validation of a blood plasma separation system by biomarker detection", Lab on a Chip, vol. 10, no. 12, pp. 1587-1595 (2010).
4. Tripathi, S. et al., "Blood plasma separation in elevated dimension T-shaped microchannel", Biomedical Microdevices, vol. 15, no. 3, pp. 415-425 (2013).
5. Lee, M. G. et al., "Inertial blood plasma separation in a contraction-expansion array microchannel", Applied Physics Letters, vol. 98, no. 25, p. 253702 (2011).
6. Blattert, C. et al., "Separation of blood in microchannel bends", The 26th Annual International Conference of the IEEE Engineering in Medicine and Biology Society, vol. 1, pp. 2627-2630 (2004).
7. Tripathi, S. et al., "Microdevice for plasma separation from whole human blood using bio-physical and geometrical effects", Scientific Reports, vol. 6, pp. 1-15, (2016).
8. Prabhakar, A. et al., "A novel, compact and efficient microchannel arrangement with multiple hydrodynamic effects for blood plasma separation", Microfluidics and Nanofluidics, vol. 18, no. 5-6, pp. 995-1006 (2015).
9. Kersaudy-Kerhoas, M. et al., "Micro-scale blood plasma separation: from acoustophoresis to egg-beaters", Lab on a Chip, vol. 13, no. 17, pp. 3323-3346 (2013).
10. Tripathi, S. et al., "Passive blood plasma separation at the microscale: A review of design principles and microdevices", Journal of Micromechanics and Microengineering, vol. 25, no. 8, pp. 1-24 (2015).
11. Yu, Z. T. F. et al., "Microfluidic blood cell preparation: now and beyond", Small, vol. 10, no. 9, pp. 1687-1703 (2015).
12. Wu, D. et al., "How long can we store blood samples: a systematic review and meta-analysis", EBioMedicine, vol. 24, pp. 277-285 (2017).
13. Dean, L., "Blood groups and red cell antigens", National Center for Biotechnology Information, p. 98 (2005).
14. Laser, D. J. et al., "A review of micropumps", Journal of Micromechanics and Microengineering, vol. 14, pp. R35-R64 (2004).
15. Au, A. K. et al., "Mail-order microfluidics: evaluation of stereolithography for the production of microfluidic devices", Lab on a Chip, vol. 7, pp. 1294-1301 (2014).
16. Au, A. K. et al., "3D-printed microfluidic automation", Lab on a Chip, vol. 15, no. 8, pp. 1934-1941 (2015).
17. Lee, Y. S. et al., "3D-printed Quake-style microvalves and micropumps", Lab on a Chip, vol. 18, no. 8, pp. 1207-1214 (2018).
18. Melvin, A. M. et al., "Modeling 3D printed check valves for microfluidic systems", 2018 IEEE International Symposium on Signal Processing and Information Technology (ISSPIT), pp. 1-6 (2018).

What is claimed is:

1. A multilevel extraction chamber, comprising:
a main channel,
a secondary channel fluidly connected to the main channel,
a plasma channel fluidly connected to the secondary channel,
a first set of a plurality of side channels fluidly connecting the main channel to the secondary channel, and
a second set of a plurality of side channels fluidly connecting the secondary channel to the plasma channel,
wherein each of the first set of side channels has an average diameter that is greater than the average diameter of each of the second set of side channels,
the main channel has an average diameter of 0.2-5 mm at a narrowest cross section, and
the first set of the plurality of side channels, and each of the second set of the plurality of side channel, each have an average diameter of 5-100 μm at the narrowest cross section.

2. The multilevel extraction chamber of claim 1, wherein the first set of the plurality of side channels, and the second set of the plurality of side channel, each have an average diameter of 5-30 μm at the narrowest cross section.

3. The multilevel extraction chamber of claim 1, wherein the main channel has an average diameter of 0.3-1.0 mm at a narrowest cross section.

4. The multilevel extraction chamber of claim 1, having a separation efficiency for whole blood of at least 95%.

5. The multilevel extraction chamber of claim 1, wherein the plasma channel has an average diameter of 1-1000 μm.

6. The multilevel extraction chamber of claim 1, further comprising an obstruction in the main channel.

7. The multilevel extraction chamber of claim 1. further comprising a plurality of obstructions in the main channel.

8. The multilevel extraction chamber of claim 1, further comprising means for internal flow rectification.

9. A microfluidic manifold, comprising:
the multilevel extraction chamber of claim 1, and
a dilution chamber, comprising:
   a dilution channel having a first end and a second end,
   a plasma inlet on the first end of the dilution channel,
   a dilutant inlet on the first end of the dilution channel, and
   a diluted plasma outlet on the second end of the dilution channel,
wherein the plasma inlet and dilutant inlet are fluidly connected to the dilution channel, and the diluted plasma outlet is fluidly connected to the dilution channel, and
wherein the extraction chamber is fluidly connected to the dilution chamber.

10. The microfluidic manifold of claim 9, further comprising means for internal flow rectification in the dilution channel.

11. The microfluidic manifold of claim 9, wherein the microfluidic manifold comprises at least one polymer selected from the group consisting of polylactic acid (PLA), acrylonitrile butadiene styrene (ABS), nylon, polyethylene terephthalate glycol-modified (PETG), thermoplastic polyurethane (TPU) and polydimethylsiloxane (PDMS).

12. The microfluidic manifold of claim 9, wherein the microfluidic manifold comprises polydimethylsiloxane (PDMS).

13. The microfluidic manifold of claim 9, further comprising a mixture of heparin and glutaraldehyde coated on the extraction chamber, and/or the dilution chamber.

14. The microfluidic manifold of claim 9, wherein the manifold is capable of extracting plasma from less than 5 mL of whole blood.

15. A method of preparing a diluted plasma sample from a whole blood sample, comprising:
pumping a whole blood sample into the microfluidic manifold of claim 9,
extracting a plasma sample from the whole blood sample, and
diluting the plasma sample.

16. The method of claim 15, wherein the sample of whole blood is diluted prior to extracting plasma from the sample of whole blood.

\* \* \* \* \*